United States Patent [19]

Stein et al.

[11] Patent Number: 5,632,865
[45] Date of Patent: May 27, 1997

[54] METHOD FOR INTRODUCTION OF AGGRESSIVE LIQUID ADDITIVES

[75] Inventors: Louis E. Stein; Philip C. Lewellen, both of Houston, Tex.

[73] Assignee: Shell Oil Company, Houston, Tex.

[21] Appl. No.: 265,993

[22] Filed: Jun. 27, 1994

[51] Int. Cl.⁶ .................... B01D 3/34; C10G 9/12
[52] U.S. Cl. .................... 203/6; 203/3; 208/47; 208/48 R; 208/48 AA; 196/127
[58] Field of Search .................. 203/6, 7, 99, 90, 203/95, 96, 97, 92, 49; 208/348, 359, 363, 47, 48 R, 48 AA; 422/7; 196/127

[56] References Cited

U.S. PATENT DOCUMENTS

| | | | |
|---|---|---|---|
| 2,908,640 | 10/1959 | Dougherty | 208/48 AA |
| 3,132,085 | 5/1964 | Summers | 208/48 AA |
| 3,174,924 | 3/1965 | Clark et al. | 208/48 R |
| 4,995,915 | 2/1991 | Sewell et al. | 134/22.14 |
| 5,211,840 | 5/1993 | Lehrer et al. | 203/7 |
| 5,284,994 | 2/1994 | Brown et al. | 208/48 AA |

*Primary Examiner*—Robert J. Warden
*Assistant Examiner*—Christopher Y. Kim

[57] ABSTRACT

The invention is a method of introducing an aggressive liquid additive into a vapor-containing process stream including (a) heating the liquid additive by a heating means thereby producing a heated additive; (b) passing the heated additive to an injection quill in fluid communication with the vapor-containing process stream; and (c) passing the heated additive from the injection quill into the vapor-containing process stream.

18 Claims, 3 Drawing Sheets

METHOD FOR INTRODUCTION OF AGGRESSIVE LIQUID ADDITIVES

FIELD OF THE INVENTION

The invention relates to a method of introducing an aggressive liquid additive in a vapor form to a vapor-containing stream.

BACKGROUND OF THE INVENTION

Aggressive liquid additives are used in vapor-containing process lines and equipment for a variety of reasons. Primarily they are used to prevent or mitigate corrosion dr fouling in the process lines and equipment. "Aggressive liquid additives" as used in this specification and appended claims means those additives which pose corrosion problems themselves if allowed to contact the internal walls of the process lines or equipment in the liquid form. Corrosion is especially a problem at higher temperatures. Such additives include amines, chloriding agents, and sulfiding agents.

The currently used method of introducing an aggressive liquid additive into a system is primarily by atomization. The additive is either directly atomized into the system or first mixed with inert gas prior to atomizing the gas/liquid mixture in the system. These known methods of introducing aggressive liquid additives into a system are inadequate. The known methods permit the aggressive liquid additive to be introduced in a liquid form. This results in corrosion from the aggressive liquid additive contacting the piping walls and other internal equipment surfaces.

Other problems also result from the atomization methods. Atomization is achieved by passing the aggressive liquid additive through small atomization nozzles. Such nozzles have multiple small passages which can be fouled or plugged over time thus requiring frequent maintenance and replacement. Where the method of mixing an inert gas is used to aid atomization, an inert gas supply is necessary. Steam is often the most readily available and cheapest inert gas available. However, steam can cause problems in some processes where water is undesirable and steam can cause corrosion and/or erosion problems. Using steam needed for other processes in the plant may cause steam shortages where needed.

A method is needed wherein the aggressive liquid additive is introduced in a form which will not contribute to corrosion and/or erosion and require steam to aid atomization. Such a method is provided by the method of this invention.

SUMMARY OF THE INVENTION

The invention is a method of introducing an aggressive liquid additive into a vapor-containing process stream including (a) heating the liquid additive by a heating means thereby producing a heated additive; (b) passing the heated additive to an injection quill in fluid communication with the vapor-containing process stream; and (c) passing the heated additive from the injection quill into the vapor-containing process stream.

DESCRIPTION OF THE PREFERRED EMBODIMENTS

A. Overvuew

Figure 1:
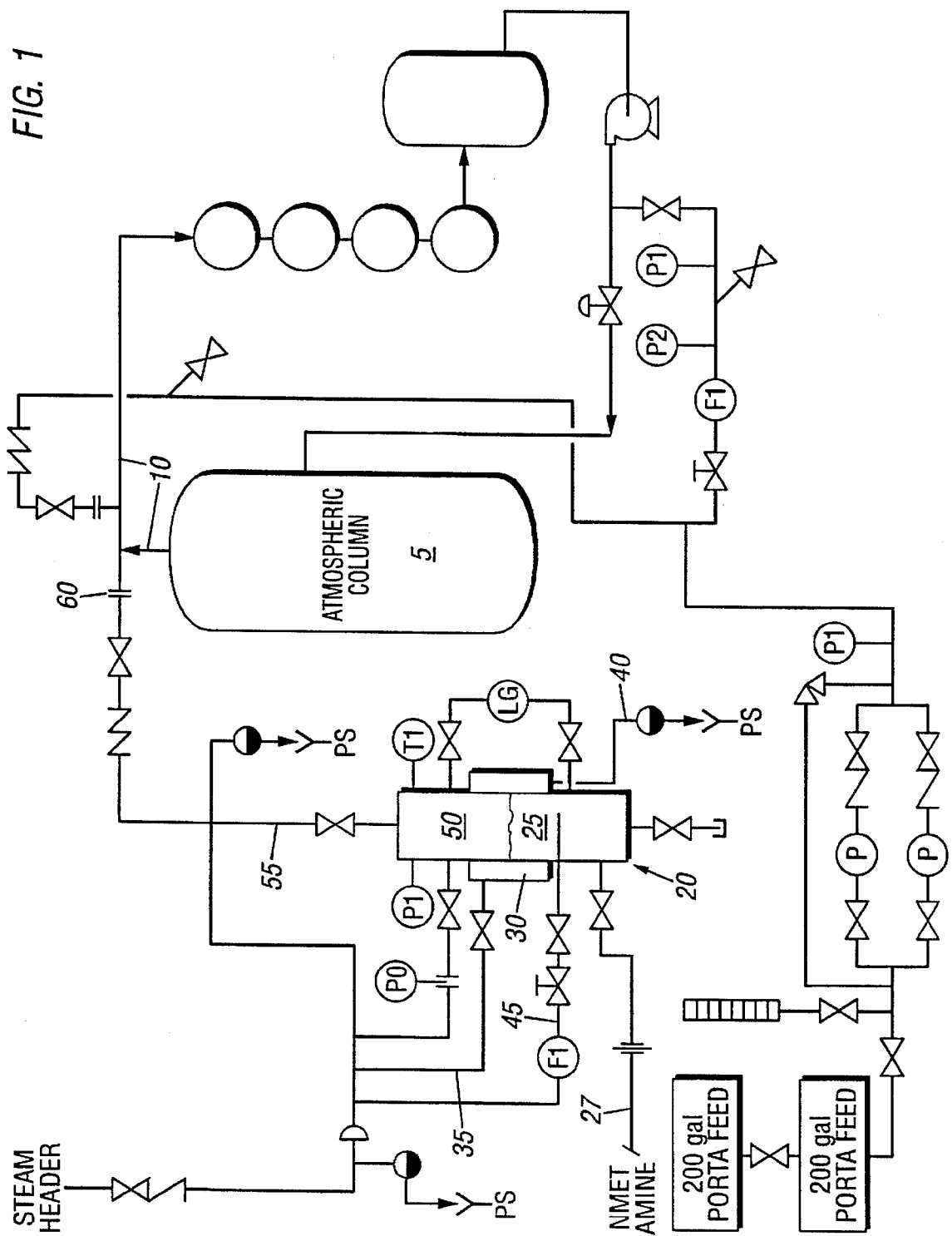
FIG. 1 depicts one embodiment of a schematic of a process flow sheet utilizing the method of the invention.

The method of the invention is a method of introducing an aggressive liquid additive into a vapor-containing process stream. The method includes (a) heating the aggressive liquid additive by a heating means thereby producing a heated aggressive liquid additive; (b) passing the heated aggressive liquid additive to an injection quill in fluid communication with the vapor-containing process stream; and (c) passing the heated aggressive liquid additive from the injection quill into the vapor-containing process stream.

Optionally, an inert gas substantially free of aggressive liquid additive and the vaporized form of the aggressive liquid additive is injected downstream of the injection quill and into the vapor-containing process stream. As a result, the inert gas substantially prevents condensation of the vaporized form of the aggressive liquid additive downstream of the injection quill.

B. Heating Means

Various types of heating means are suitable for use with the method of this invention. In one embodiment of the invention the heating means includes a heat transfer tubing. The heat transfer tubing is in thermal contact with a process stream conduit having an elevated temperature. The aggressive liquid additive is passed through the heat transfer tubing and recovered. As a result, heat is transferred from the process stream conduit to the heat transfer conduit to the aggressive liquid additive, thus producing a heated aggressive liquid additive The process stream providing the heat is typically the vapor-containing process stream in which the additive is being injected. Thermal contact can be obtained by wrapping the tubing delivering the additive to the process stream around the process stream conduit. Where such wrapping is used, the amount of wrappings can be varied to obtain the desired heat input to adequately vaporize the additive. Typically, from about 5 feed to about 40 feet of tubing is used. However, the exact amount will vary for each application. Spacing between the wrappings will vary, but is typically equal to about 1 diameter of the tubing.

In one embodiment of the invention the heating means is any conventional heat exchanger. In another embodiment the heating means is a vaporizer vessel with an optional sparging line. With a vaporizer vessel the aggressive liquid additive is collected in a container having a jacket. A hot fluid is passed through the jacket, thereby producing a heated aggressive liquid additive. Inert sparging gas may be passed through the liquid, thereby facilitating vaporization of the aggressive liquid additive. At least a portion of the heated aggressive liquid additive vaporizes thus forming a vaporized form of the aggressive liquid additive.

The aggressive liquid additives become corrosive at high temperatures. Typically a sufficiently high temperature will be reached in the heating means such that the liquid additives will become corrosive in the heating means. Accordingly, corrosion-resistant alloys should be used for the construction of the heating means. Typically, corrosion-resistant alloys have high nickel or chromium contents. Once the liquid additive is vaporized it is no longer corrosive. Accordingly, corrosion-resistant alloys need not be used downstream of the point in the heating means where the additive is vaporized. Also, the heating means and lines from the heating means to the injection quill should be insulated to avoid heat loss.

C. Process Parameters

The pressure in the heating means and lines carrying the additive to the injection quill will typically be at substantially the same pressure as the vapor-containing process stream. The amount of heat to vaporize the aggressive liquid additive will vary for each additive used. Typically, however, with amine-type additives about 600 BTU/LB of additive is needed to vaporize the liquid additive. Typically less than about 1 percent weight based on the mass flow rate of the process stream, of the additive is added to the process stream. This will vary depending on the additive. Some additives will only be added in very small amounts such from about 0.001 to about 0.1 percent weight based on the mass flow rate of the process stream.

The location at which the liquid additive vaporizes is not critical so long as it is in vapor form before or upon entering the vapor-containing process stream. Thus the aggressive liquid additive will be vaporized prior to or upon passing from the injection quill into the vapor-containing process stream. Alternatively, the aggressive liquid additive is vaporized prior to passing from the heating means to the injection quill.

As mentioned above, the additive is not corrosive in the vapor form and the line containing the vaporized form of the aggressive liquid additive need not be a corrosion-resistant alloy. Thus, if the additive is vaporized prior to leaving the heating means, the lines downstream of the heating means need not be a corrosion-resistant alloy.

Additional heat may be necessary to heat the liquid additive hot enough so that it will not condense prior to reaching the vapor-containing process stream. Such considerations involve economic considerations of comparing the cost of heat versus the cost of corrosion-resistant alloys. Such economic considerations are not intended to limit this invention. The additive mixture being injected from the injection quill to the vapor-containing process stream is at least about 70 percent by weight of the vaporized form of the aggressive liquid additive, based on the combined weight of the vaporized and non-vaporized additive. Preferably, about 100 percent by weight of the mixture is in the vaporized form of the aggressive liquid additive.

D. Detailed Description of the Drawings

1. FIG. 1

FIG. 1 depicts one embodiment of a schematic of a process flow sheet utilizing the method of the invention. Distillation column 5 produces vapor-containing process stream 10. Vaporizer vessel 20 contains aggressive liquid additive 25, which is fed to the vaporizer vessel through line 27. Steam is passed into steam jacket 30 through line 35 and out line 40 to heat the aggressive liquid additive. Optionally, a sparging fluid such as steam or other inert gas is passed through line 45 into the aggressive liquid additive 25. The sparging fluid passes through the liquid additive and mixes with the vaporized form of the aggressive liquid additive 50 above the liquid additive 25, thereby reducing the partial pressure and vaporization temperature of the liquid aggressive additive.

The vaporized form of the aggressive liquid additive 50 above the liquid additive 25, optionally mixed with sparging fluid, ("additive mixture") exits the vaporizer vessel 20 through line 55. The additive mixture is injected into vapor-containing process stream 10 through injection quill port 60 (injection quill not shown, see FIG. 2 for details of injection quill port and injection quill).

2. FIG. 2

Figure 2:
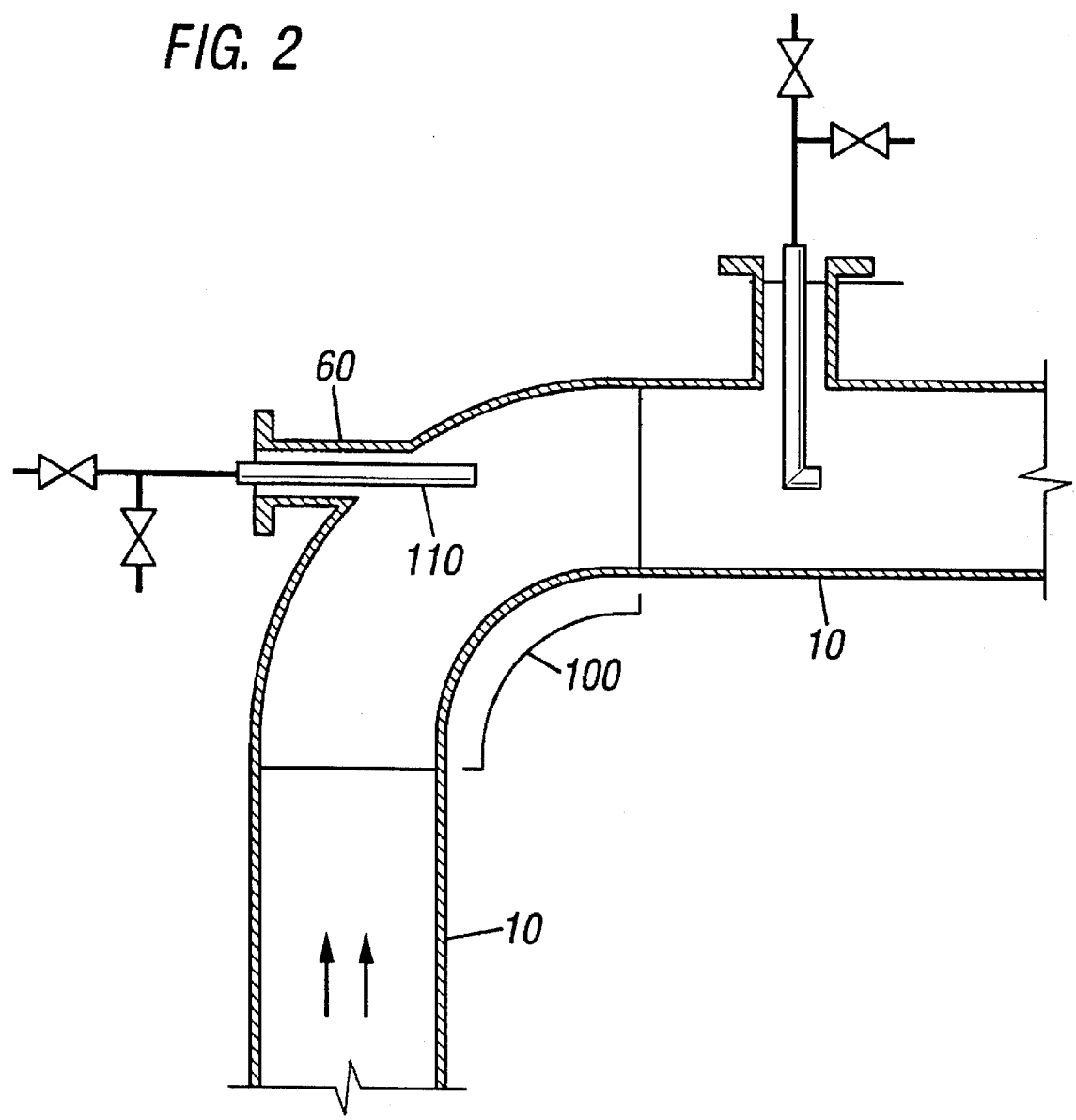
FIG. 2 depicts a cross-sectional view of one embodiment of an injection quill and vapor-containing process stream.

FIG. 2 depicts a cross-sectional view of one embodiment of an injection quill and vapor-containing process stream. Vapor-containing process stream 10 changes direction ninety degrees by way of elbow 100. Injection quill port 60 is situated on the outer portion of the elbow so that the injection quill can be arranged to disperse the additive mixture substantially in the center of the vapor-containing process stream and substantially in the same direction of flow as the vapor-containing process stream.

3. FIG. 3

Figure 3:
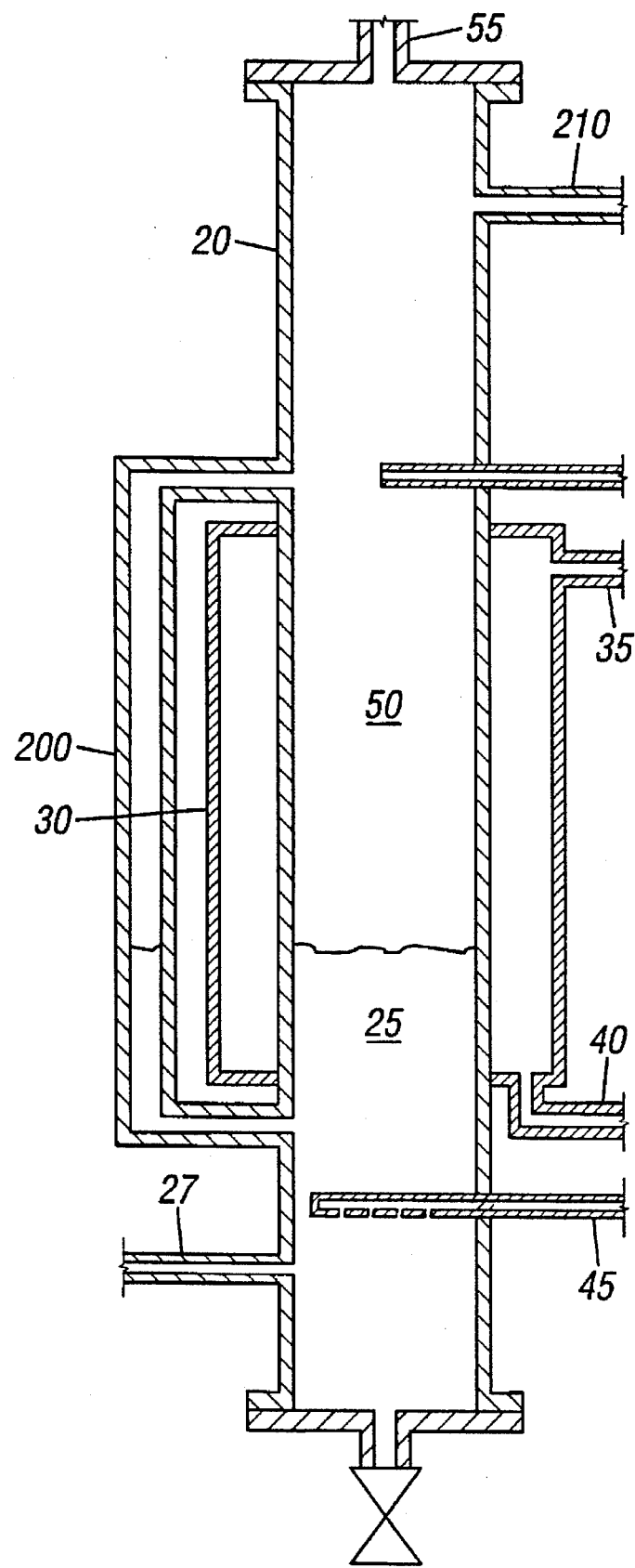
FIG. 3 depicts a schematic of an embodiment of a vaporizer and sparger.

FIG. 3 depicts a schematic of an embodiment of a vaporizer and optional sparger line. Vaporizer vessel 20 contains aggressive liquid additive 25, which is fed to the vaporizer vessel through line 27. The liquid level is monitored by level gauge 200. Steam is passed into steam jacket 30 through line 35 and out line 40 to heat the aggressive liquid additive. Optionally, a sparging fluid such as steam or other inert gas is passed through line 45 into the aggressive liquid additive 25. The sparging fluid passes through the liquid additive and mixes with the vaporized form of the aggressive liquid additive 50 above the liquid additive 25, thereby reducing the partial pressure and vaporization temperature of the liquid aggressive additive.

The vaporized form of the aggressive liquid additive 50 above the liquid additive 25, optionally mixed with sparging fluid, is further optionally mixed with additional dilution steam or other inert gas through line 210. The resulting additive mixture exits the vaporizer vessel 20 through line 55.

ILLUSTRATIVE EMBODIMENT

A. Prior Art Method One

For corrosion reduction ammonia was injected into the overhead line of distillation column A used for fractionating crude oils. Also for corrosion reduction, sodium hydroxide was injected into the liquid feed to the column. The ammonia was injected as a gas and the sodium hydroxide was injected as a liquid. Over a period of five years there were no substantial corrosion problems of the overhead line. However, the presence of reaction products of ammonia and sodium hydroxide in the product had adverse affects on product quality and processability. Accordingly, the ammonia and sodium hydroxide mixture was replaced with a corrosion reducing amine-based aggressive liquid additive.

The amine-based aggressive liquid additive was injected to the overhead line of column A through an atomizer in a liquid form. Within six months of using the amine-based aggressive liquid additive in the atomized liquid form, the heat exchanger and associated piping downstream of the overhead line suffered severe corrosion damage. It was necessary to shut down column A to repair the heat exchanger.

B. Prior Art Method Two

A corrosion reducing amine-based aggressive liquid additive was injected directly into the reflux stream which went into the distillation column B used for fractionating lubricating oils. As a result of this method, the column became fouled by a build-up of salts. The salts formed from reactions between the amine and the chlorides in the crude oil. Within a period of two years, the salt fouling was sufficient to require shutting down the column for repair.

C. Method of Invention

After repair of column B used in Prior Art Method Two, above, by removing the salt fouling and replacing pads as necessary, the method of adding the aggressive liquid additive was changed to one embodiment of the method of this invention. The aggressive liquid additive was heated using a vaporizer with sparger line as depicted in FIGS. 1 and 2. The additive was injected in the vaporized form. This method was begun on Aug. 5, 1993. As of June, 1994, a period of over nine months, there has been no fouling of column A. Tests of water condensing from downstream condensor units indicate a substantially neutral pH which indicates little or no corrosion.

What is claimed is:

1. A method of introducing an aggressive liquid additive into a vapor-containing process stream comprising
   (a) heating said aggressive liquid additive by a heating means thereby producing a heated aggressive liquid additive;
   (b) passing said heated aggressive liquid additive to an injection quill in fluid communication with said vapor-containing process stream; and
   (c) passing said heated aggressive liquid additive from said injection quill into said vapor-containing process stream.

2. The method according to claim 1 wherein at least a substantial portion of said aggressive liquid additive is vaporized prior to passing from the injection quill into said vapor-containing process stream, thereby producing a mixture consisting essentially of said aggressive liquid additive and a vaporized form of said aggressive liquid additive.

3. The method according to claim 1 wherein said aggressive liquid additive is vaporized prior to passing from said heating means to said injection quill, thereby producing a mixture consisting essentially of said aggressive liquid additive and a vaporized form of said aggressive liquid additive.

4. The method according to claim 3 wherein said mixture consists essentially of at least about 70 percent by weight of said vaporized form of said aggressive liquid additive.

5. The method according to claim 4 wherein said mixture comprises at least about 70 percent by weight of said vaporized form of said aggressive liquid additive.

6. The method according to claim 1 wherein said heating means comprises a heat transfer tubing, wherein said heat transfer tubing is in thermal contact with a process stream conduit having an elevated temperature, wherein said aggressive liquid additive is passed through said heat transfer tubing and recovered, wherein heat is transferred from the process stream conduit to the heat transfer conduit to the aggressive liquid additive, thereby producing a heated aggressive liquid additive.

7. The method according to claim 6 wherein there is sufficient thermal contact between said heat transfer tubing and said process stream conduit such that said aggressive liquid additive is vaporized prior to passing from the injection quill into said vapor-containing process stream, thereby forming a vaporized form of said aggressive liquid additive.

8. The method according to claim 6 further comprising (d) injecting an inert gas substantially free of said vaporized form of said aggressive liquid additive downstream of said injection quill and into said vapor-containing process stream, wherein said inert gas substantially prevents condensation of said vaporized form of said aggressive liquid additive downstream of said injection quill.

9. The method according to claim 7, wherein from about 0.001 wt. percent to about 0.1 wt. percent of said aggressive liquid additive, based on the mass flow rate of said vapor-containing process stream, is introduced into said vapor-containing process stream.

10. A method of introducing an aggressive liquid additive into a vapor-containing process stream comprising
    (a) passing said aggressive liquid additive to a heat exchanger, wherein said aggressive liquid additive is heated a sufficient amount to vaporize at least a portion of said aggressive liquid additive; thereby producing a mixture consisting essentially of said aggressive liquid additive and a vaporized form of said aggressive liquid additive;
    (b) recovering said mixture from said heat exchanger;
    (c) passing said mixture to an injection quill in fluid communication with said vapor-containing process stream; and
    (d) passing said mixture from said injection quill into said vapor-containing process stream.

11. The method according to claim 10 wherein said mixture consists essentially of at least about 70 percent by weight of said vaporized form of said aggressive liquid additive.

12. The method according to claim 11 wherein said mixture comprises at least about 70 percent by weight of said vaporized form of said aggressive liquid additive.

13. The method according to claim 10 further comprising (e) injecting an inert gas substantially free of said aggressive liquid additive and said vaporized form of said aggressive liquid additive downstream of said injection quill and into said vapor-containing process stream, wherein said inert gas substantially prevents condensation of said vaporized form of said aggressive liquid additive downstream of said injection quill.

14. The method according to claim 11, wherein from about 0.001 wt. percent to about 0.1 wt. percent of said aggressive liquid additive, based on the mass flow rate of said vapor-containing process stream, is introduced into said vapor-containing process stream.

15. A method of introducing an aggressive liquid additive into a vapor-containing process stream comprising
    (a) collecting said aggressive liquid additive in a container having a jacket; and passing a hot fluid through said jacket, thereby producing a heated aggressive liquid additive, and wherein at least a portion of said heated aggressive liquid additive vaporizes, thereby forming a vaporized form of said aggressive liquid additive;
    (b) recovering said vaporized form of said aggressive liquid additive;
    (c) passing said vaporized form of said aggressive liquid additive to an injection quill in fluid communication with said vapor-containing process stream; and
    (d) passing said vaporized form of said aggressive liquid additive from said injection quill into said vapor-containing process stream.

16. The method of claim 15 further comprising sparging said aggressive liquid additive with an inert gas, thereby reducing the partial pressure and vaporization temperature of said liquid aggressive additive.

17. The method according to claim 16 further comprising injecting an inert gas substantially free of said aggressive liquid additive and said vaporized form of said aggressive liquid additive downstream of said injection quill and into said vapor-containing process stream, wherein said inert gas substantially prevents condensation of said vaporized form of said aggressive liquid additive downstream of said injection quill.

18. The method according to claim 16, wherein from about 0.001 wt. percent to about 0.1 wt. percent of said aggressive liquid additive, based on the mass flow rate of said vapor-containing process stream, is introduced into said vapor-containing process stream.

* * * * *